April 9, 1963   F. A. KROHM   3,084,372
WINDSHIELD WIPER ASSEMBLY
Original Filed March 9, 1953

INVENTOR.
FRED A. KROHM
BY
Charles S. Penfold
ATTORNEY 3,084,372
WINDSHIELD WIPER ASSEMBLY
Fred A. Krohm, Hobart, Ind., assignor to The Anderson Company, a corporation of Indiana
Continuation of abandoned application Ser. No. 341,052, Mar. 9, 1953. This application Oct. 14, 1959, Ser. No. 846,296
41 Claims. (Cl. 15—250.36)

This invention relates to windshield wipers and particularly to wiping elements for windshield wiper blades wherein there is provided a longitudinal portion of reduced thickness to serve as a hinge member between the head portion and the wiping portion, whereby to facilitate flexing of the head portion from side to side as the blade passes across the glass.

This application is a continuation of my application Serial No. 341,052, filed March 9, 1953, now abandoned.

This in preferred form refers to a hinged construction similar to that shown in the John W. Anderson Patent Number 2,596,063 which issued on May 6, 1952. An undesirable characteristic of the construction shown in said patent and in various other commercial wiping elements is that the portions of the wiping element adjacent its extremities have less resistance to lateral flex-over than portions intermediate those extremities. This is because all such intermediate portions have extending in either direction therefrom a continuation of the cross section of the wiping element, whereby to provide resistance to such excessive flexing as would promote abnormal distortion of portions of the wiping element.

At the extremities of the wiping element as shown in said patent, the lower initial resistance to frictional "drag" permits excessive flex-over under conditions which cause the wiping edges to cramp in snakelike formation on the glass. Experience has shown that this excessive flex-over, under certain operating conditions, increases substantially the power required to drive the blade across the glass. This is undesirable in that it requires additional power, which adds to the cost of the power unit which drives the wiper.

Such increased resistance is also undesirable because, particularly where a vacuum windshield wiper motor is used, any increase in the resistance of the wiping element as it passes across the glass causes an earlier stall of the wiper blade as the vacuum applied to the motor decreases progressively as the engine accelerator is opened wider. This stall is particularly noticeable when the opening of the accelerator is more abrupt, as for passing other cars. Under all driving conditions it is desirable to have the stall period reduced to the greatest possible extent in order that more continuous wiping of the windshield may be effected for safety. The subject invention, by reducing the frictional "drag" of the wiping element, reduces the period during which the wiper remains stalled.

Attention is directed to the fact that in the wiper blade assembly shown in FIGURE 1 it has been found desirable to distribute wiper arm pressure in such manner that it is applied approximately equally at four points on the wiping element, two of these points being close to the extremities of the element. The lack of outwardly continued support for the hinge portion of the element at the extremities tends to cause the ends to yield excessively toward the windshield, with undesirable results elsewhere herein described. By increasing the resistance of the end portions of the wiping element to flex-over, the substantially uniform distribution of pressure at the four points mentioned becomes more effective.

There may be conditions making it desirable to limit application of the subject invention to a single extremity of the wiping element, or to vary its form in its application to the respective extremities of the wiping element, or to apply it at various degrees of proximity to such extremities. Various gradations of enlargement or contraction of cross section of the wiping element may be employed where desirable to meet varying requirements for pressure distribution.

Another undesirable characteristic of the construction of the wiping element shown in said patent is that when the wiper element freezes to the glass, as under sleet conditions, the driver of the car is inclined to try to pull the wiper blade forcefully from the glass. Under such conditions, and responsive to a well-understood characteristic of material subjected to a tearing stress, the hinge portion is inclined more readily to start tearing at its extremities. A "pull" which would not tear the hinge portion or distort it permanently, when applied at portions of the wiping element intermediate its extremities, does cause tearing to start when applied to an extremity. Once tearing starts it proceeds more easily.

A purpose of this invention is to provide more uniform resistance to flex-over—throughout the entire length of the wiping element, and particularly to prevent excessive flex-over at the extremities of the wiping element—to obviate the undesirable condition above described and, in addition, to promote more uniform wear across the full length of the wiping element, thus promoting more uniform wiping results.

A further purpose of the invention is to prevent tear of the hinge portion starting at the extremities of the wiping element, as above described and, in addition, to prevent early failure and cracking of the hinge at the extremities under oxidation and other deteriorating influences such as occur during aging of the wiping element in service on the windshield.

To accomplish the above-recited purposes and to attain other objects which are made apparent in this description, the cross section of the wiping element adjacent its extremities is formed as shown in FIGURE 3 of the drawing. In this cross section the grooves occurring at either side of the wiping element as a means of providing a narrowed section to serve as a hinge portion are not permitted to extend uniformly to the extremities, and terminate or are reduced short of those extremities so that the portions of the wiping element adjacent the extremities offer greater resistance to flexing and thereby may be constrained to flex, under a given frictional load, only approximately as much as intermediate portions of the wiping element flex under such load. It may be desirable in some instances merely to reduce, adjacent the extremities of the wiping element, the depth of the grooves which form the hinge portion; and not to fill in the grooves completely, while still providing a sufficiently less flexible extremity of the wiping element to achieve the purposes hereof.

By means of omitting or reducing the grooves, such reinforcement of the element adjacent its ends also serves to reduce the tendency to start tear at those ends, or extremities.

It is obvious that the amount of added resistance to flexing to be provided by the use of the invention herein described may be varied by varying the longitudinal and/or lateral extent of the filled-in cross section as shown in FIGURE 5.

Since the advent of larger windshields requiring longer blades and longer arms, the torque loads on windshield wipers have increased very substantially, particularly where curved windshields create additional load occasioned by resistance to the necessary flexing of the wiping element and movements of its superstructure, caused by constant changing to adapt to the varying conformation of the glass to be wiped.

It of course is obvious that this invention is useful also where blades with continuously rigid holders, as for use on flat windshields, are involved, for reasons above described.

The importance of this invention will be better understood when it is stated that the power requirements of windshield wiper motors under increased loads created by wider and curved windshields recently have seemed likely to force a redesign of many windshield wiper motors being used for original equipment, in order to provide additional power to handle the additional load with enough excess margin to provide, under all conditions, satisfactory performance. This necessity, with all its tremendous costs and incidental added demands upon the vacuum supply or on the car battery, whichever may be the source of power for the windshield wiper motor, has been avoided in important instances by a reduction of the frictional resistance of the wiping element of the windshield wiper. It will thus be seen that the substantial reduction of frictional resistance provided by the subject invention is of major importance in the field of wiping windshields.

Lower frictional resistance of wiping elements has always been desirable. The problem has been to attain such low resistance without impairing the wiping qualities of the wiping element. The subject invention reduces resistance while at the same time improving the wiping qualities of portions of the wiping element adjacent its extremities.

One particular advantage of the invention resides in the fact that it may be applied to one or more operative portions of the wiping element of the blade.

Additional objects and advantages of the invention will become apparent after the description hereinafter set forth is considered in conjunction with the drawings annexed hereto.

In the drawings:

FIGURES 1, 2 and 3 exemplify one modification of the invention;

The modifications of the invention will be described in the above order.

Figure 1:
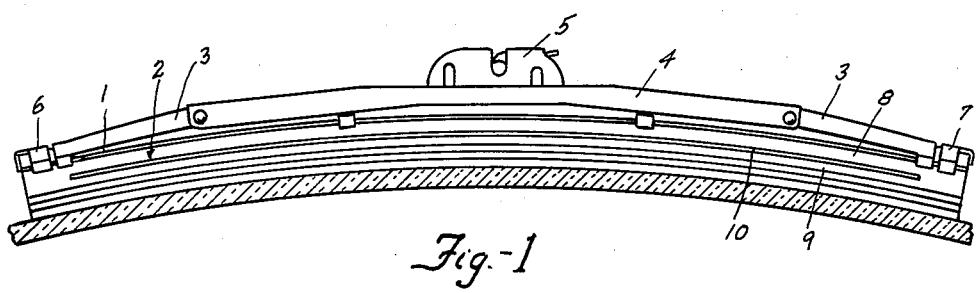
FIGURE 1 is a side view in elevation of a windshield wiper as applied to the curved surface of a windshield or other surface to be cleaned.

The wiper assembly illustrated in FIGURE 1 comprises a wiper blade and a pressure device. The blade includes an elongate uniformly flexible support 1 and a wiping element generally designated 2 and the pressure device preferably includes a pair of corresponding secondary yokes 3, a primary yoke 4 having its ends connected to intermediate portions of the secondary yokes and a connector 5 carried by the primary yoke for attaching the wiper assembly to a wiper arm. The ends of the secondary yokes are operatively associated with the support for applying and distributing pressure thereto at a plurality of points for conforming the blade to the surface to be cleaned. A pair of clips or fasteners 6 and 7 are detachably connected to the ends of the support so that the wiper blade and pressure device may be readily assembled and disassembled and to permit the substitution of a new blade when required.

Figure 2:
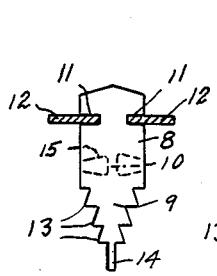
FIGURE 2 is an end view of the wiping element with portions of its support in section.
Figure 3:
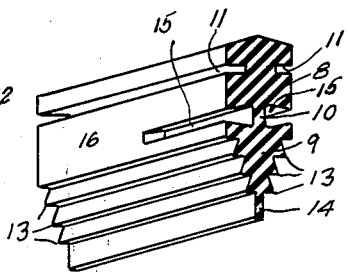
FIGURE 3 is a partial enlarged perspective view of the wiping element showing the application of the invention thereto.

The wiping element as clearly illustrated in FIGURES 2 and 3 includes an attaching portion 8 and a generally triangular wiping head 9 connected to the attaching portion by means of a hinge 10 so that the wiping head may flex, oscillate or move relative to the attaching portion when the wiper assembly is moved back and forth across a windshield. The attaching portion 8 may be constructed as desired, but as herein illustrated the sides thereof are provided with longitudinally extending grooves 11 which receive longitudinal portions 12 of the support as clearly shown in FIGURE 2. The sides of the wiping head are preferably provided with a plurality of longitudinally extending independently operable wiping edges 13 and a longitudinal flexible lip 14 which flexes relative to the head when the blade assembly is in operation.

The hinge 10 joining the attaching portion with the wiping head of the element is preferably formed by providing longitudinally extending interruptions or dovetail grooves 15 in the sides of the element. It will be noted that the portion of the wiper element in which the grooves 15 are formed is substantially square or rectangular in cross section. As clearly illustrated and indicated at 16 in FIGURE 3 the element is made so that the grooves terminate short of the ends of the element in order that the extremities or end portions of the element are solid cross sections and thereby made less resilient than the intermediate wiping portion of the element which is actually hinged to the attaching portion. In other words, there is less opportunity for the end portions of the element to flex or yield. As pointed out above, the absence of outwardly extending continued support for the extremities of the wiper blade tends to cause the extremities to yield excessively toward the windshield. By increasing the resistance of the end portions of the wiping element to flex-over the substantially uniform distribution of pressure at the four points applied by the yokes becomes more uniform and effective.

Figure 4:
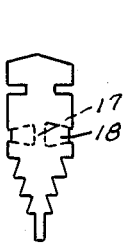
FIGURES 4 and 5 illustrate a second modification of the invention.
Figure 5:
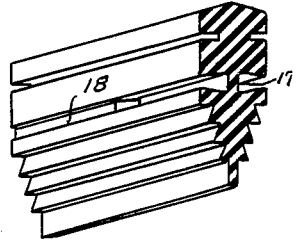

As pointed out above, one advantage of the invention resides in the fact that it can be made or applied to a wiper element in different ways. For example, in the second modification of the invention illustrated in FIGURES 4 and 5, an element can be formed with an elongate intermediate hinge portion 17 corresponding to the hinge portion 10 and a thicker or stronger hinge portion 18 at each extremity of the element. This particular arrangement affords some additional flexing of the wiping head as compared to the wiping head in the first modification. It is, of course, obvious that the hinge may be varied to suit different operating conditions required. For example, the length of the intermediate hinge portion and the thickness of any additional hinge portion or portions may be varied. It is also to be understood that in some applications of the invention it may be desirable to embody the invention in only one of the extremities of a wiper element.

Figure 6:
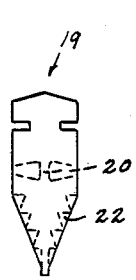
FIGURES 6 and 7 represent a third modification of the invention.
Figure 7:
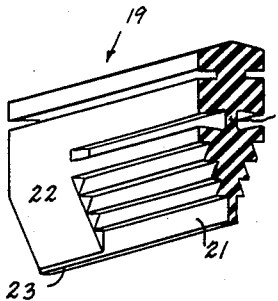

In the third modification of the invention exemplified in FIGURES 6 and 7 of the drawing, there is shown a wiper element 19 having a hinge portion 20 of a greater length than the hinge portions 10 and 17 above referred to. The element is also formed so that the edges of the wiping head and a lip 21 thereon are of substantially the same length as that of the hinge. In other words, the wiping edges along the sides of the head do not extend the full length of the blade and as a result the extremities of the element as indicated at 22 are rendered more rigid or less resilient than the extremities or ends above described. It will be noted that flexation or movement of the wiping lip is also reduced. As indicated at 23, portions of the lip are extended so as to afford wiping action the full length of the element.

Figure 8:
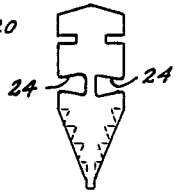
FIGURES 8 and 9 represent a fourth modification of the invention.
Figure 9:
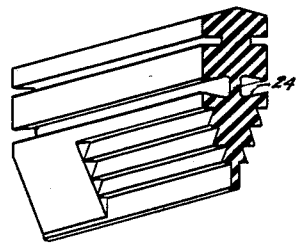

The element shown in FIGURES 8 and 9 of the drawing is similar to the embodiment in FIGURES 6 and 7 except for the fact that the element is provided with grooves 24 which extend the full length of the element to allow for a greater flexation of the wiping head relative to the attaching portion while providing less resilience at the extremities of the wiping head.

Figure 10:
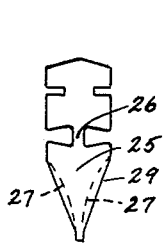
FIGURES 10 and 11 represent a nonelected modification of the invention.
Figure 11:
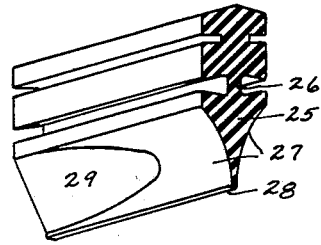

The element depicted in FIGURES 10 and 11 is provided with a wiping head 25 joined to an attaching portion by a hinge 26 extending the full length of the element. The sides of the wiping head are preferably formed with corresponding relatively shallow coves or grooves 27 which form a wiping head of generally spear shape having a wiping portion or lip 28. The coves at each extremity of the element are preferably provided with a formation 29 which tapers inwardly from the said extremities to thicken the wiping head and thereby reduce the resilience or flexation of the head and particularly the lip at the extremities of the element. This feature of tapering or gradual reduction in the cross-sectional dimension of the extremities of a wiper element offers certain advantages over the embodiments of the invention described above.

Having thus described my invention, it is obvious that various other modifications may be made in the same without departing from the spirit of my invention; hence I do not wish to be understood as limiting myself to the exact forms, constructions, arrangements and combinations of parts herein shown and described or uses mentioned.

I claim:

1. An elongate resilient windshield wiper element, said element having an attaching portion for connection with a support, and also having a wiping portion, and a hinge joining the wiping portion to the attaching portion, said hinge being of a length less than the length of the element so that there is less tendency for the wiping portion to move relative to the attaching portion at one location than at another location.

2. An elongate resilient windshield wiper element, said element having an attaching portion for attachment to a support, a head hinged to the attaching portion and provided with a wiping lip movable with respect thereto, and means for reinforcing the lip at the ends of the element so that it is movable to a lesser extent at said ends than therebetween.

3. An elongate resilient windshield wiper element having an attaching portion provided with a first pair of side grooves for receiving portions of an elongate flexible support, the sides of the element being provided with a second pair of grooves spaced from the first pair of grooves to form a wiping portion hinged to the attaching portion, said second pair of grooves terminating short of the ends of the element.

4. An elongate resilient windshield wiper element having an attaching portion and a wiping head provided with a plurality of wiping edges along its sides, a relatively short hinge adjacent each end of the element joining the wiping head and attaching portion, and a relatively long hinge located between the end hinges joining the said portions of the element, said end hinges offering greater resistance to flexure than the long hinge.

5. A windshield wiper element having an elongate attaching portion for attachment to a support, and also having an elongate wiping portion, said elongate portions being joined together by a longitudinally extending hinge to locate the longitudinal axes of said elongate portions in parallel relation and so that the wiping portion may move relative to the attaching portion, and said hinge being of a length less than the length of the element.

6. An elongate resilient wiper element having an attaching portion for connection with a support, the sides of the element being provided with a pair of grooves forming a wiping portion joined to the attaching portion by a hinge affording oscillatory movement of the wiping portion with respect to the attaching portion, said grooves terminating short of the ends of the element.

7. The structure defined in claim 6, in which the grooves are dovetail in shape so that the width of the hinge is greater than the width of the grooves adjacent the sides of the element.

8. An elongate resilient windshield wiper element having an attaching portion provided with means for receiving a support, each side of the element being provided with a groove to form a wiping portion hinged to the attaching portion, said grooves terminating short of the ends of the element.

9. An elongate resilient wiper element having an attaching portion for connection with a support and having a wiping portion joined to the attaching portion by an intermediate restricted portion affording oscillatory movement of the wiping portion with respect to the attaching portion, said intermediate restricted portion terminating short of at least one end of the element.

10. An elongate resilient wiper element, said element being solid throughout its medial height and having a substantially uniform cross-sectional configuration throughout an appreciable portion of its length and provided with a tiltable wiping part which is substantially solid and V-shaped in cross section throughout the extent of the appreciable portion, said element also being provided with a pair of grooves, elongate support means seated in said grooves, and means formed integrally with and substantially within the confines of the configuration of the element at a predetermined location so that the wiping part at this location offers a greater resistance to lateral flexing than an adjacent portion of the part.

11. An elongate resilient windshield wiper element provided with a tiltable wiping part which is solid and substantially V-shaped in cross section throughout substantially its length, and means formed integrally with the element and substantially within the confines of the part at a predetermined location which offers a greater resistance to lateral flexing than does an adjacent portion of such part.

12. An elongate windshield wiper element provided with a wiping part which is solid in cross section and has sides converging toward one another, support means carried by said element for limiting its movement in a plane substantially perpendicular to a surface to be wiped, and means formed integrally with and substantially within the confines of the sides at a predetermined location so that there is less tendency for the wiping part at this location to yield relative to an adjacent portion of the element.

13. An elongate resilient wiper element, said element being solid throughout its medial height and having an attaching portion for connection with a support, a wiping portion connected with said attaching portion for tilting movement relative thereto, elongate support means carried by said element for limiting its movement in a plane substantially perpendicular to a surface to be wiped, and means formed integrally with respect to one longitudinal part of at least one end of said wiping portion for adding resistance to flexing of said part relative to the remainder of the wiping portion.

14. In a windshield wiper assembly, a flexible wiper blade comprising an elongate resilient wiping element supported by elongate flexible backing means, said backing means being normally flexible only in a plane substantially perpendicular to a windshield and being relatively inflexible in a plane transverse thereto, said resilient wiping element having a wiping part oscillatably movable relative to the backing means in a direction substantially transverse to the longitudinal axis of said backing means, means for reinforcing at least one portion of said wiping part so that said wiping part is relatively less flexible at said reinforced portion than throughout the remainder of the wiping element, and pressure-transmitting means connected with said backing means for applying wiper arm pressure thereto at a plurality of longitudinally spaced points.

15. A resilient windshield wiper element, said element being elongate and having sides provided with longitudinally extending exterior grooves for receiving portions of a resiliently flexible support for the element, said element including a tiltable wiping portion which is thicker in cross section at one predetermined location so as to offer greater resistance to tilting than at some other location.

16. A windshield wiper blade comprising an elongate resilient wiper element and a separate resiliently flexible elongate support connected thereto for restricting movement of the blade to a plane substantially perpendicular to a surface area to be wiped, said element including a tiltable wiping portion disposed below the support for movement with respect thereto, and means provided on the wiping portion for retarding to some extent its tilting movement at one extremity thereof.

17. A windshield wiper blade comprising an elongate resilient wiper element and a separate resiliently flexible elongate support connected thereto for restricting movement of the blade to a plane substantially perpendicular to a surface area to be wiped, said element including a tiltable wiping portion disposed below the support for movement with respect thereto, and means carried by the blade for retarding to some extent the tilting movement of one extremity of the wiping portion.

18. A resilient windshield wiper element, said element being elongate and having sides provided with longitudinally extending exterior grooves, said element also being provided with a tiltable wiping portion and formed so that the grooves terminate short of one extremity of the element to render that extremity less tiltable than an adjacent portion of greater longitudinal extent.

19. A windshield wiper blade comprising elongate support means and an elongate wiper element of resilient material loosely connected to the support means and provided with a longitudinally extending tiltable portion, said element having a greater mass of material at one end thereof for increasing the stability thereof and offering a greater resistance to the tilting of the tiltable portion at said end as compared to the remainder of its length.

20. A windshield wiper blade comprising an elongate support means and an elongate wiper element of resilient material having a longitudinally extending portion loosely connected to the support means and a longitudinally extending wiping portion which is tiltable relative to its connected portion, said wiper element having at one end thereof a mass of material which offers a greater resistance to the tilting of the wiping portion at said end as compared to the remainder of its length.

21. A windshield wiper blade comprising elongate support means and an elongate wiper element of resilient material having a portion attached to the support means and a longitudinally extending wiping portion joined to the remainder of the element by an intermediate restricted portion constituting a hinge connecting the wiping portion for tilting movement throughout substantially its full length relative to the attached portion, said element having a greater mass of material at one end thereof which serves to decrease the extent of the tilting movement of the wiping portion at this location as compared to the remainder thereof.

22. A windshield wiper element, said element being resilient and having a longitudinally extending portion for attaching the element to an elongate support, said element also having a longitudinally extending wiping portion which is substantially coextensive and freely tiltable throughout the major portion of its length with respect to the attaching portion, said element having a greater mass of material at one extremity which offers a greater resistance to the tilting of the wiping portion at such extremity than throughout substantially the remainder of its length.

23. A windshield wiper element, said element comprising a first longitudinally extending portion for attachment to an elongate support means, a second longitudinally extending portion provided with a tiltable wiping edge portion extending substantially parallel to said first portion, and portions tapering longitudinally of said element with respect to said edge portion to thicken said edge portion at one area whereby to offer a greater resistance to the tilting of the edge portion at this area as compared to an adjacent area.

24. A windshield wiper element, said element comprising an elongate attaching portion for connection with a support and a yieldable portion provided with an elongate wiping lip disposed in parallel relation to said attaching portion which is yieldable to a greater degree than said yieldable portion, said lip being thicker at one area whereby to offer a greater resistance to yieldability as compared to an adjacent area of its length.

25. An elongate windshield wiper element, said element being constructed of resilient material and provided with longitudinally extending side grooves forming a bendable wiping portion, and means closing off at least portions of the grooves defining a wiping portion which is less bendable than the portion formed by the grooves.

26. An elongate resilient windshield wiper element, said element being solid throughout its medial height and having a longitudinal back portion for attachment to support means and a longitudinal portion provided with a lip having a pair of wiping edges, support means carried by said element for limiting its movement in a plane substantially perpendicular to a surface to be wiped, and means formed integrally with the element and converging toward said lip for rendering the lip less responsive to flexure at one location as compared to an adjacent location.

27. A windshield wiper assembly comprising elongate supporting structure and an elongate resilient wiping element carried by the structure, means on the structure for pivotally connecting the assembly to a spring-urged wiper arm, said element including a wiping part below the structure having a portion of appreciable length which is oscillatable within one range of movement and an adjacent portion of a shorter length having a greater mass of material which is oscillatable within a smaller range of oscillation.

28. A windshield wiper blade adapted for connection with a spring-urged wiper arm, said blade comprising an elongate support and an elongate resilient wiping element, said support having a thickness, width and length to enable the same to readily flex substantially in a single plane, said element having a longitudinal back portion connected to the support and a longitudinal wiping portion for conformably engaging a surface to be wiped, said back portion and said wiping portion being joined together by a longitudinal solid medial portion affording lateral movement of the wiping portion with respect to the back portion, and means formed integrally with the element and located below the support for rendering a portion of the wiping portion less responsive to lateral movement at one location than at another location.

29. A windshield wiper blade assembly comprising an elongate resiliently flexible backing and an elongate resilient wiper element attached to the backing and having an oscillatable wiping portion which is disposed in parallel relation to and below said backing, said wiping portion being formed with variable cross-sectional dimensions so that said portion may oscillate a greater extent at one location than at another location.

30. A windshield wiper blade assembly comprising an elongate supporting means provided with means intermediate its length for connection with a wiper arm, an elongate resilient wiper element having a back portion attached to said supporting means and a wiping portion which is hingedly connected to the back portion, said hinge having a thicker cross section at one location or area than at an adjacent location or area so that said portion may oscillate a lesser extent at said one location than at said adjacent location.

31. A windshield wiper blade assembly comprising an elongate supporting means provided with means intermediate its length for connection with a wiper arm, an elongate resilient wiper element attached to said supporting means and having a longitudinal portion located below said supporting means, said longitudinal portion having a substantially uniform cross section throughout its length and provided with a relatively thin medially disposed lip which is oscillatable with respect to said longitudinal portion, and means disposed between said longitudinal portion and said lip for retarding oscillation of the lip at least at one location within its length.

32. An element for wiping a surface, said element comprising an elongate single strip of resilient material having a pair of substantially parallel longitudinally extending portions, one of said portions being formed for attachment to an elongate support and the other of said portions being hingedly connected to said one portion for tiltable movement with respect thereto along a longitudinal area between said portions and provided with a wiping edge extending throughout its length, and means formed integrally with said element at a location in said hinged area serving to render said other portion less tiltable at such location as compared to an adjacent portion of said other portion.

33. A wiper blade assembly comprising an elongate resilient element and an elongate flexible supporting means adapted for flexation in a plane substantially perpendicular to a surface to be cleaned, said element having a pair of longitudinally extending portions, one of said portions being attached to said supporting means and the other of said portions being bendable with respect to said one portion along a longitudinal area between said portions and provided with a wiping edge for engaging such surface, and means formed integrally with said element at a location in said area and below said supporting means serving to render said other portion less bendable at such location as compared to an adjacent portion of said other portion.

34. A windshield wiper element, said element being constructed of a single strip of resilient material substantially solid in cross-section throughout its medial height and length and having a first longitudinal portion for attachment to an elongate support and a second longitudinal portion joined in parallel relation to said first portion for tilting movement with respect thereto, said second portion having a substantially uniform cross section and being provided with a bendable wiping lip for engaging a surface to be cleaned, and means formed integrally with and externally of said element between said second portion and said lip offering a greater resistance to bending of the latter at one location as compared to another location.

35. A windshield wiper element, said element being constructed of a single strip of resilient material substantially solid in cross section throughout its medial height and length and having a longitudinal attaching portion for connection with an elongate support and a longitudinal wiping portion movable with respect to said attaching portion, means formed integrally with said element throughout a continuous longitudinal area between said portions offering some resistance to such movement of said wiping portion, and means formed integrally with said element through out another continuous longitudinal area between said portions offering lesser resistance to such movement of said wiping portion.

36. A windshield wiper element, said element being constructed of a single strip of resilient material substantially solid in cross section throughout its medial height and length and having a longitudinal attaching portion for connection with an elongate support and a longitudinal wiping head portion joined to said attaching portion along a longitudinal area therebetween for tilting movement with respect to said attaching portion, and means formed integrally with and externally of said element at least at one location in said area offering a greater resistance to the tilting of said wiping head portion as compared to an adjacent portion thereof.

37. A windshield wiper element, said element being elongate and resilient and having a longitudinal attaching portion for connection with an elongate support, said element also including a bendable longitudinal portion having a pair of wiping edges extending substantially throughout the full length of the element, said bendable longitudinal portion having sides respectively provided with a plurality of longitudinally extending wiping edges disposed in parallel relation to said pair of wiping edges and having a length somewhat less than said pair.

38. A windshield wiper element, said element comprising an elongate resilient body having a longitudinally extending attaching portion for connection to a support and a longitudinally extending wiping portion joined to said attaching portion by an intermediate restricted portion of a predetermined length to promote movement of the wiping portion with respect to said attaching portion throughout one longitudinal area of the element, and a portion joining said longitudinally extending portion throughout another longitudinal area offering resistance to such movement.

39. A windshield wiper element, said element comprising an elongate attaching portion for connection with a support and a yieldable portion movable relative to said attaching portion and provided with an elongate wiping lip movable relative to said yieldable portion, means formed integrally with said element at one location which offers a greater resistance to movement of said yieldable portion relative to said attaching portion at such location as compared to an adjacent location on the element, and means formed integrally with said element at another location which offers a greater resistance to movement of said wiping lip relative to said yieldable portion at this location as compared to an adjacent location on said element.

40. An elongate resilient wiper element having a first longitudinally extending portion provided with an upper surface, and a second longitudinally extending portion joined to said first portion and provided with a bendable wiping edge, said element also having a pair of outer exposed side surfaces and a pair of longitudinally extending continuous grooves respectively interrupting these surfaces and disposed between and in spaced parallel relation to said upper surface and said edge and terminating short of the ends of the element.

41. A resilient wiper element comprising an elongate body having outer exposed side surfaces and an elongate portion of solid uniform cross section extending substantially throughout the length thereof, each of said side surfaces being provided with a longitudinally extending groove terminating short of the ends of said element, an elongate wiping lip joined to said elongate portion for oscillation with respect thereto and having a length substantially coextensive therewith, and said element having means integral therewith and disposed between said elongate portion and said lip at a predetermined location so that a portion of said lip adjacent said means is rendered less oscillatable than another portion of said lip.

References Cited in the file of this patent

UNITED STATES PATENTS 2,596,063   Anderson _____ May 6, 1952

FOREIGN PATENTS 504,083   Great Britain _____ Apr. 19, 1939
543,533   Great Britain _____ Mar. 2, 1942